(12) United States Patent
Frey

(10) Patent No.: US 7,682,535 B2
(45) Date of Patent: Mar. 23, 2010

(54) METHOD OF FILLING THE CAVITY OF A TOOL

(75) Inventor: Jürgen Frey, Kirchheim/Teck (DE)

(73) Assignee: Priamus System Technologies AG, Schaffhausen (CH)

( * ) Notice: Subject to any disclaimer, the term of this patent is extended or adjusted under 35 U.S.C. 154(b) by 517 days.

(21) Appl. No.: 10/473,521

(22) PCT Filed: Apr. 2, 2002

(86) PCT No.: PCT/EP02/03609

§ 371 (c)(1),
(2), (4) Date: Mar. 8, 2004

(87) PCT Pub. No.: WO02/081177

PCT Pub. Date: Oct. 17, 2002

(65) Prior Publication Data

US 2004/0135277 A1  Jul. 15, 2004

(30) Foreign Application Priority Data

Apr. 5, 2001 (DE) .............................. 101 16 998
Nov. 12, 2001 (DE) .............................. 101 55 162

(51) Int. Cl.
B29C 45/78 (2006.01)
B29C 45/77 (2006.01)

(52) U.S. Cl. .................. 264/40.6; 264/328.8; 264/40.7

(58) Field of Classification Search .............. None
See application file for complete search history.

(56) References Cited

U.S. PATENT DOCUMENTS 5,008,052 A * 4/1991 Harada ................. 264/40.5
6,062,087 A * 5/2000 Vovan ................... 73/726
6,649,095 B2 * 11/2003 Buja ..................... 264/40.6

FOREIGN PATENT DOCUMENTS

DE  198 03 352  *  8/1999

OTHER PUBLICATIONS

Translation of DE 19803352.*

* cited by examiner

*Primary Examiner*—Monica A Huson
(74) *Attorney, Agent, or Firm*—Bachman & LaPointe, P.C.

(57) ABSTRACT

A method of filling the cavity of a tool used for production of a molded part from a melt, especially the cavity of an injection molding machine, wherein the melt is introduced into the cavity under pressure and is subjected to a dwell pressure towards the end or at the end of its flow path. The tool wall temperature is determined at the end of the flow path of the melt and the switching point for switching to the dwell pressure is determined from the increase of the tool wall temperature.

2 Claims, 2 Drawing Sheets

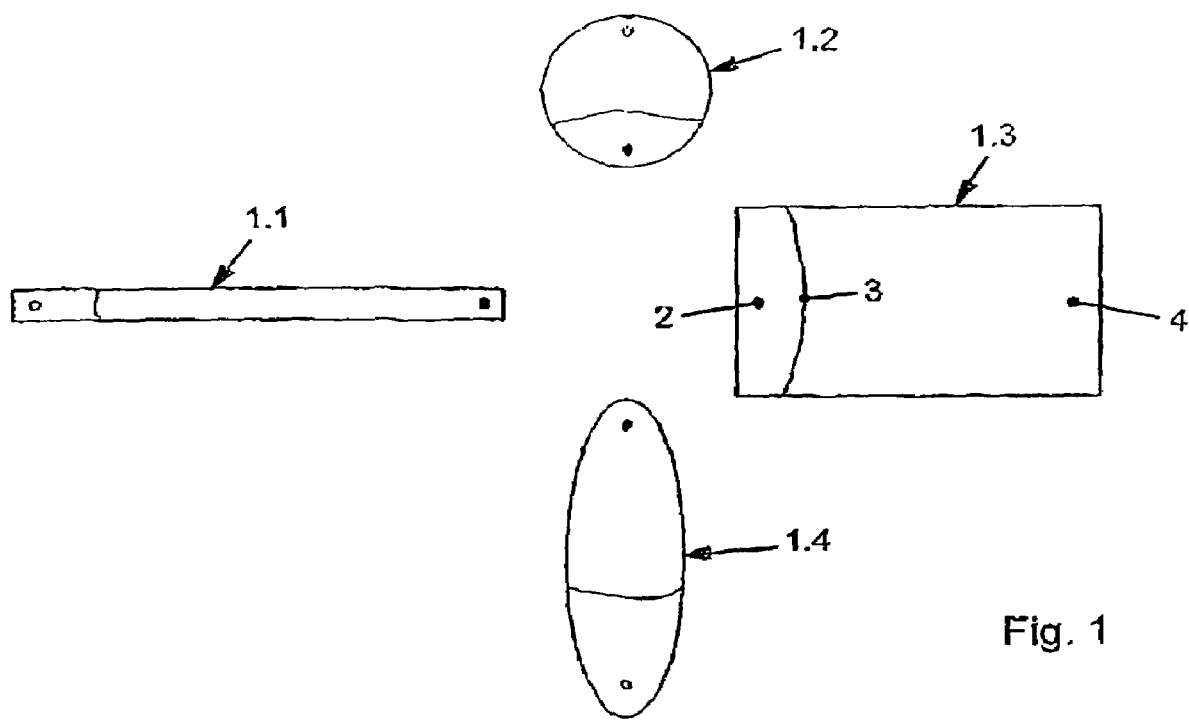
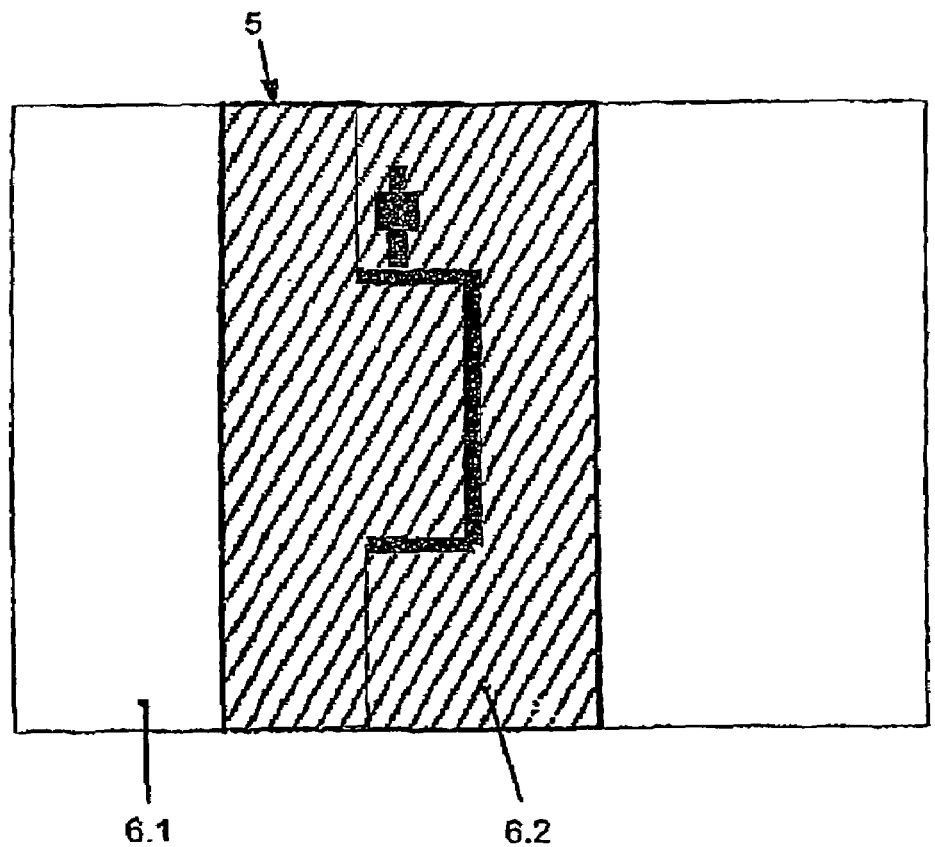
Fig. 1
Fig. 2

METHOD OF FILLING THE CAVITY OF A TOOL

BACKGROUND OF THE INVENTION

The invention relates to a method for filling a cavity of a mold for producing a molding from a melt, in particular a cavity of an injection-molding machine, in which the melt is introduced into the cavity under pressure and is placed under a holding pressure toward the end or at the end of its flow path.

To influence the uniformity and good quality of injection-molded products, it is known to determine the temperature of the melt. By way of example, in accordance with JP 61255825, the temperature of the melt or the currently measured temperature of the mold is compared with a multiplicity of predetermined temperature values.

During injection molding or also, for example, during die casting, the cavity in a mold or die is filled with a melt, in particular comprising plastic, metal or a ceramic. This filling operation continues until the cavity has been filled, after which the process is switched over to what is known as the holding-pressure phase, in which in particular shrinkage of the material in the cavity is also compensated for.

The determination of the changeover time from the introduction phase to the holding-pressure phase is an important factor. Manual optimization is difficult and time-consuming, and consequently is only seldom carried out correctly in practice.

A fixed changeover from the injection operation to the holding-pressure operation cannot react to process-induced fluctuations, for example in the viscosity, which in turn leads to a considerable fluctuation in the quality of the moldings.

By way of example, EP 0 707 936 A2 or U.S. Pat. No. 5,993,704 describes methods for determining the changeover time when producing an injection molding. These methods are used to automatically determine the time of volumetric filling in the mold cavity.

The existing methods are generally based on measuring the internal pressure. By way of example, the "kink" between the introduction phase and the holding-pressure phase, which results automatically, is determined with the aid of artificial intelligence.

In practice, however, it has been found that the calculation times in some cases result in excessive delays, which automatically entail pressure peaks and stresses in the molding. Moreover, it is impossible to universally cover all applications.

In a further method, the pressure differences between two mold internal-pressure sensors are determined and the profile of these differences over the course of time is analyzed. A sudden drop in the signal (=kink detection) means that volumetric filling has been detected.

Both the methods described above require relatively expensive sensor means and electronics and are not reliable processes.

DE 198 03 352 A has disclosed a method for determining the time of a pressure rise in a mold, with the process being switched over from the injection pressure to the holding pressure as a result of the pressure rise. In this case, the pressure rise is determined not by means of pressure sensors but rather by means of temperature sensors.

The present invention is based on the object of developing a method of the type described above which makes it possible to switch over to the holding-pressure phase in a simple and cost-effective way yet nevertheless with a relatively high level of accuracy.

SUMMARY OF THE INVENTION

The foregoing object is achieved by the mold wall temperature being determined toward the end of the flow path of the melt and the changeover point to the holding-pressure phase being determined.

The novel method is therefore based on measurement of the mold internal wall temperature at the end of the flow path of the melt. A basic consideration in this context is the fact that in theory the changeover should always occur at approx. 97 to 98% of the flow path in order ultimately to achieve the desired 100% on account of the inertia factor.

When the melt reaches the position of a corresponding thermocouple, there is a sudden increase in the signal which can be used without further intelligence, e.g. as an analog switching signal.

Since the flow path length is known to the toolmaker in all cases, it is possible to provide a suitable stipulation with regard to the positioning of an inexpensive thermocouple without any difficulty whatsoever.

In addition to the function of determining the changeover time, the thermocouple can also perform further functions. By way of example, it can be used to control the shrinkage, to effect temperature-dependent cooling time control or to automatically balance the volumetric filling of the cavity.

In the conventional injection-molding process, a centrally controlled flow of melt is distributed to one or more feed points for the injection molding, a distinction being drawn between cold runner and hot runner systems. In the case of what are known as cold runner molds with a plurality of feed points, it is in principle almost impossible to control the filling operation in each individual feed area, since the plastic melt also naturally solidifies in the gate system after each cycle and it is therefore not possible to influence the individual filling.

However, in what are known as hot runner systems, there is the possibility of separately controlling the flow of melt through each individual feed point with the aid of one or more injection plungers, irrespective of whether these are a plurality of feed points for a single injection molding (e.g. a bumper) or a plurality of feed points in different parts of a mold.

A commercially available system controls the flow of melt to individual injection nozzles with the aid of separate plungers by measuring the pressure in the hot runner.

Although this procedure does allow a predetermined speed or by analogy a predetermined melt flow to be controlled for each individual plunger, it is not in this way possible to use real measurement signals in the injection molding itself to implement control as a function of the quality of the injection molding.

The volumetric filling can be automatically determined for each feed point or for each hot runner nozzle with the aid of a thermocouple at the end of the flow path, and in this way the control operation can be influenced (changeover from filling operation to holding-pressure operation).

BRIEF DESCRIPTION OF THE DRAWINGS

Further advantages, features and details of the invention will emerge from the following description of preferred exemplary embodiments and with reference to the drawings, in which:

FIG. 1 diagrammatically depicts mold families;

FIG. 2 diagrammatically depicts a modular mold system, partially in section;

DETAILED DESCRIPTION

Figure 3:
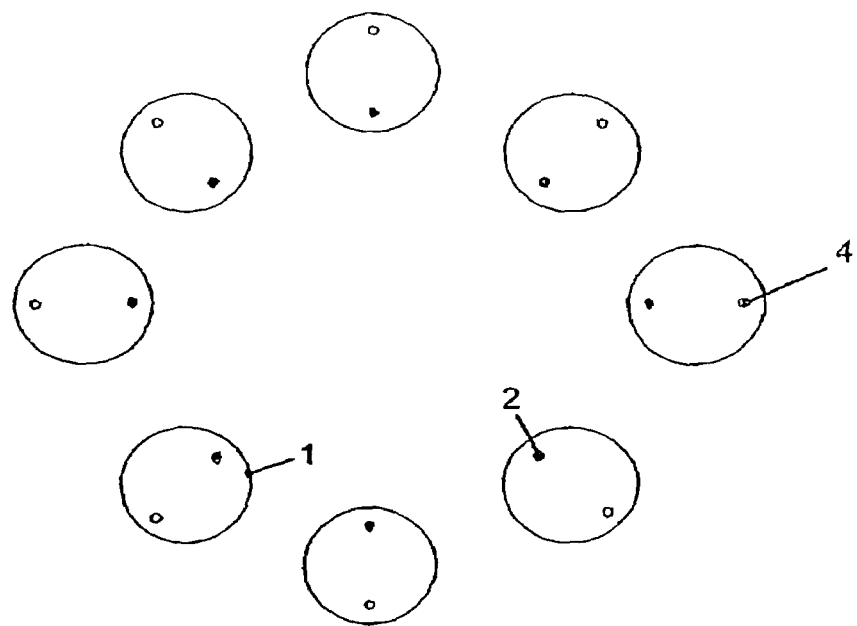
FIG. 3 diagrammatically depicts multi-impression molds.

FIG. 1 shows a mold family with four cavities 1.1 to 1.4. Each cavity 1.1 to 1.4 has a different geometry, depending on the molding desired.

A melt is introduced into the cavity 1.1 to 1.4 through the injection point 2, with a melt front being denoted by 3.

Each cavity 1.1 to 1.4 is assigned a thermocouple 4 toward the end of the flow path.

This mold family is used to produce a plurality of injection moldings of different dimensions, different volumes and different weights. The advantage is primarily that it is possible to assemble different parts on site. However, without control of the melt flow to the individual cavities 1.1 to 1.4 the resulting quality of the injection moldings is left to chance, i.e. a small cavity, such as for example the cavity 1.1 and 1.2, would be switched over to pressure control from velocity control much too late, leading to compression during the filling phase, resulting in stresses. On the other hand, a large cavity would be switched over much too early, resulting in the moldings being distorted and in an undefined filling operation.

The positioning of a thermocouple 4 at the end of the respective flow path means that it is automatically determined in each cavity 1.1 to 1.4 when the volumetric filling is reached. At the same time, the measured wall temperatures can also be used for ongoing control of the shrinkage.

FIG. 2 shows a mold 5 which comprises two mold inserts 6.1 and 6.2. In this case, the mold insert 6.2 is intended to be exchangeable.

One specific advantage of the method according to the invention arises in particular if the actual mold inserts have to be changed very frequently, as is the case in particular with a modular mold system. In this case, a new changeover point has to be optimized after each change between mold inserts. The use of thermocouples in each case at the end of the filling operation means that this changeover point is always determined automatically, and consequently there is no need for this optimization step.

FIG. 3 shows a multi-impression mold having a multiplicity of cavities 1, each cavity 1 having its own injection point 2 and its own thermocouple 4. The aim in the case of a multi-impression mold with a plurality of geometrically identical cavities is to control the melt flow in such a way that all the cavities are filled and switched over simultaneously. If a balancing system of this type is not used, the processor will often want to switch over as a function of a very specific, selectable cavity. In this case too, this changeover can be realized automatically and significantly more easily with the aid of a thermocouple, and the mold wall temperature in turn provides additional information, for example for controlling the shrinkage of the moldings.

Figure 4:
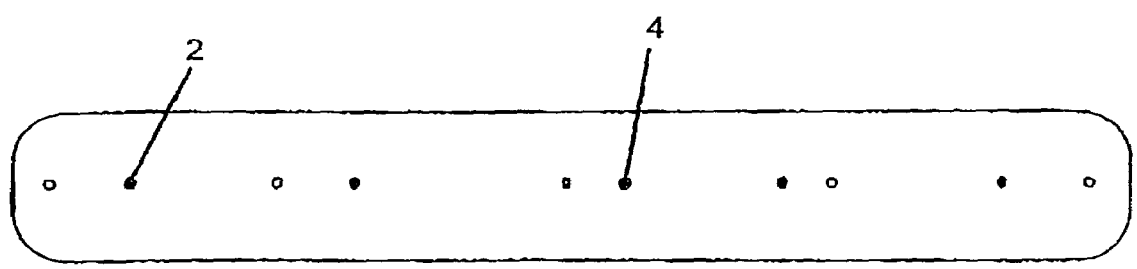
FIG. 4 diagrammatically depicts a single-impression mold with multiple gates.

A single-impression mold with multiple gates as shown in FIG. 4 is generally used to produce very large injection moldings (e.g. bumpers) with long flow paths. The problem in this case is generally not that of finding a single changeover point, but rather of controlling the flow front of the melt with the aid of sensors in the cavity until volumetric filling is achieved in such a way that the hot runner nozzles at each injection point 2 can be controlled in accordance with the programming selected. This principle can be realized using relatively expensive mold internal pressure sensors, but relatively inexpensive thermocouples 4 fulfill the same purpose. If the individual melt flows are individually controlled, as above, the same principle applies in a similar way.

The invention claimed is:

1. An injection molding method for filling a closed cavity of an injection mold comprising:
    (a) providing a closed mold cavity;
    (b) providing a temperature sensor in a wall of the closed mold cavity at a location near the end of the melt flow path for directly monitoring the temperature of the mold wall near the end of the melt flow path;
    (c) feeding a melt to the closed mold cavity whereby the melt in the closed mold cavity is under pressure;
    (d) determining when the melt contacts the temperature sensor based on a sudden change in temperature resulting from the melt contacting the temperature sensor;
    (e) determining a changeover point after the sudden change in temperature is determined in step (d) on the basis of the monitored temperature before the mold cavity is filled with the melt; and
    (f) switching over to a holding pressure phase at the changeover point determined in step (e).

2. A method as claimed in claim 1, wherein the temperature is monitored at a point along the melt flow path of at least about 97%.

* * * * *